Patented Mar. 6, 1928.

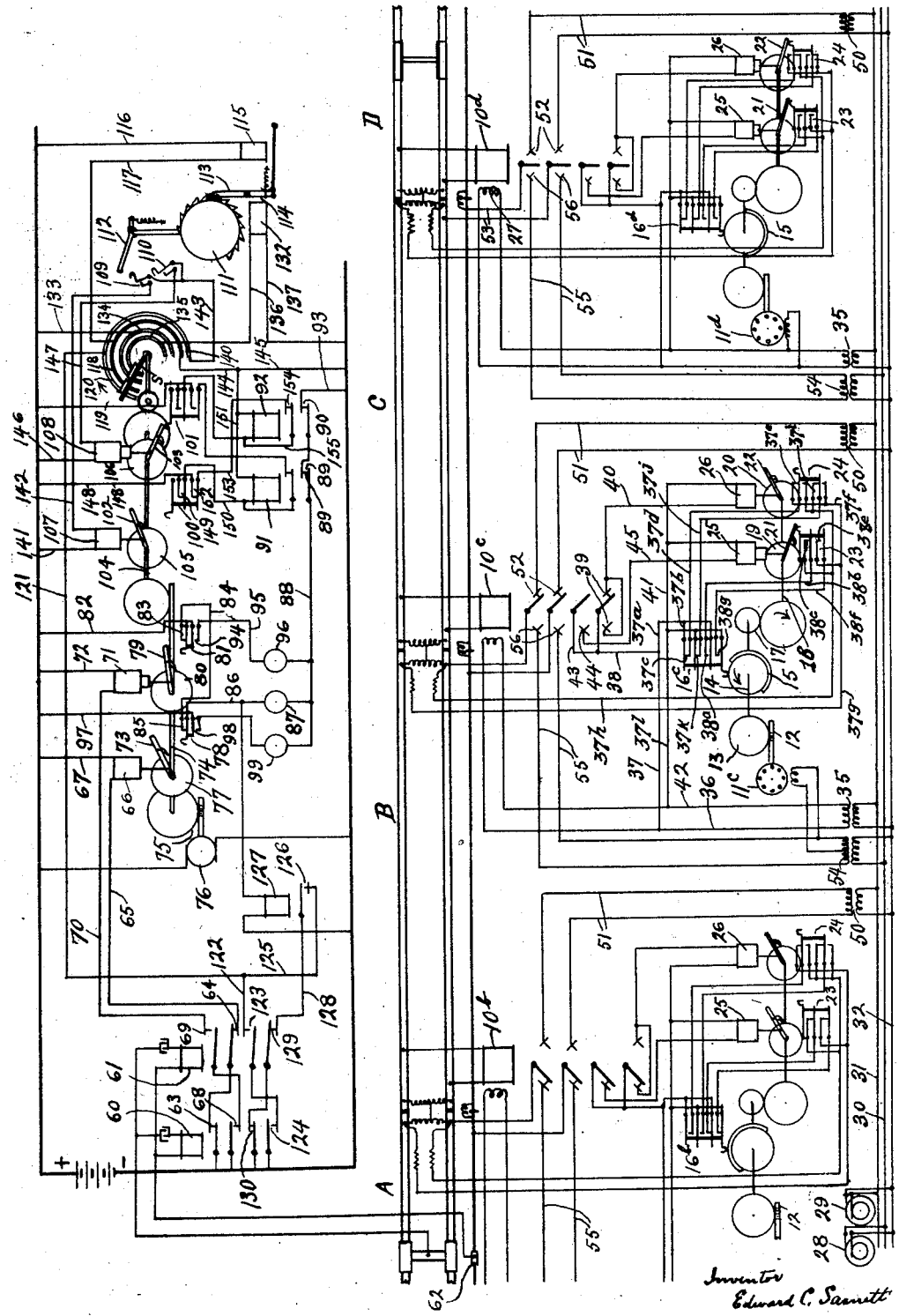

1,661,508

UNITED STATES PATENT OFFICE.

EDWARD C. SASNETT, OF WASHINGTON, DISTRICT OF COLUMBIA.

RAILWAY SIGNALING.

Application filed January 20, 1926. Serial No. 82,532.

The present invention relates to railway signaling and particularly to signaling systems of this character in which the indications are controlled by current impulses of differing character. The invention is illustrated as applied to the signaling of an electrically operated road, the third rail, or power conductor, being employed for the transmission of the signaling impulses, but the invention is equally applicable to roads of other character.

Referring to the accompanying drawing, which shows diagrammatically a system embodying the invention:—

The track rails and the power conductor are divided into insulated blocks A, B, C, D, etc., the insulated joints being bridged by inductive bonds to permit the passage of propulsion current but to divide the track and third rail into sections with respect to the signaling current, in a manner well understood by those skilled in this art. Connected across the track rails at the entrance ends of the blocks are track relays 10$^b$, 10$^c$, 10$^d$ etc., and associated with each track relay is a motor operated switch mechanism for controlling the application of energy to the exit ends of the blocks.

This switch mechanism is operated by a single phase motor 11$^c$, 11$^d$ etc. The armatures of these motors are rigid with worms 12 meshing with worm wheels 13 secured to shafts 14, to each of which is secured a cam disk 15 having a raised portion extending through an arc of 180°, the said raised portions periodically operating switches 16$^b$, 16$^c$, 16$^d$ etc. Each shaft 14 drives through gear wheels 17 at a reduced speed a shaft 18 on which are secured wheels 19 and 20. Pivoted on shaft 18 adjacent said wheels are arms 21 and 22 which carry pawls engaging the peripheries of the wheels, whereby the arms are freely rotatable in a counter-clockwise direction, but are constrained to rotate in a clockwise direction with their respective wheels. When arm 21 approaches the limit of its movement in a clockwise direction it opens the contacts of a switch 23, and when arm 22 approaches the limit of its movement in a clockwise direction it opens the front contacts and closes the back contacts of a switch 24. Arm 21 is connected to the plunger of a solenoid 25, so that it is rotated to the limit of its movement in a counter-clockwise direction when this solenoid is energized. Similarly, arm 22 is connected to the plunger of a solenoid 26.

The track relays are of the three position type, having a winding connected across the track rails and a winding 27 energized by current of the same frequency as that of the track circuit current but displaced in phase therefrom. The movable contacts of these relays occupy a neutral, or central, position when the track windings are deenergized, and occupy a position to one side or the other of the central position when the track current is of one relative polarity or the opposite relative polarity, as is well understood by those skilled in this art.

Signaling currents of two different frequencies are employed in the system illustrated, the said currents being supplied by alternators 28 and 29 connected respectively to line wires 30 and 31 and a common wire 32. The frequencies of the two currents may for example be 60 and 120.

Normally the track circuit current flows continuously but its relative polarity is periodically reversed by the operation of switches 16, as will hereinafter appear. Hence normally the movable contacts of the track relays vibrate from one position to the other with a frequency depending upon the operation of switches 16. When the movable contacts of the track relays occupy either operated position the circuits of solenoids 26 are closed, each of said circuits being from one side of transformer 35, conductors 36, 37 and 38, either contact 39, conductor 40, solenoid 26, and conductors 41 and 42 to the other side of the transformer. The circuit of solenoid 25, however, is closed only when the movable contacts of the track relays occupy their left hand positions. This circuit is as follows: from one side of transformer 35, conductors 36, 37, 38 and 43, contact 44, conductor 45, solenoid 25, and conductors 41 and 42 to the other side of said transformer. Normally, therefore, solenoids 26 will be substantially continuously energized and solenoids 25 will be intermittently energized. Arm 22 will accordingly be raised, and the front contacts of switches 24 will be closed while the back contacts thereof will be open. The intermittent energizations of solenoids 25 under normal conditions will be of such frequency that arms 21 never engage switches 23, so that under normal conditions the contacts of switches 23 are closed.

The track circuit current is supplied from the secondaries of transformers 35 either through the back contacts of switch 16 in series with the front or back contacts of switch 24 or through the front contacts of switch 16 in series with the front contacts of switch 23. Under normal conditions track current is supplied alternately through the back contacts of switch 16 and the front contacts of switch 24, when the switch 16 is engaged by the low part of cam disk 15, and through the front contacts of switch 16 and the front contacts of switch 23, when switch 16 is engaged by the raised part of cam disk 15. The track circuit for block B, for example, through the back contacts of switch 16$^c$ and the front contacts of switch 24 is as follows: from one terminal of the secondary of transformer 35, conductor 36, conductors 37, 37$^a$ and 37$^b$, back contacts 37$^c$ of switch 16$^c$, conductor 37$^d$, front contacts 37$^e$ of switch 24, conductors 37$^f$ and 37$^g$ to the upper rail of block B, the winding of track relay 10$^b$, the lower rail, conductor 37$^h$, front contact 37$^i$ of switch 24, conductor 37$^j$, back contacts 37$^k$ of switch 16$^c$, conductors 37$^l$ and 42 to the other terminal of the secondary of transformer 35. The track circuit for block B through the front contacts of switch 16$^c$ and the front contacts of switch 23 is as follows: from the first mentioned terminal of the secondary of transformer 35, conductors 36, 37, 37$^a$, front contacts 38$^a$ of switch 16$^c$, conductor 38$^b$, front contacts 38$^c$ of switch 23, conductor 37$^f$ the lower rail of block B, the winding of track relay 10$^b$, the upper rail, conductor 37$^g$, front contacts 38$^d$ of switch 23, conductor 38$^e$, front contacts 38$^f$ of switch 16$^c$, conductor 37$^l$ and conductor 42 to the other terminal of the secondary of transformer 35. It will be observed that when the secondary of transformer 35 is connected to the track rails through the back contacts of switch 16 and the front contacts of switch 24 the relative polarity of the track current is opposite to that when the secondary of said transformer is connected to the track rails through the front contacts of switch 16 and front contacts of switch 23. Thus the secondary of transformer 35 is connected across the track rails with one relative polarity during a half revolution of cam 15 and with the opposite relative polarity during the other half revolution of said cam, under normal conditions. These periodic reversals of the track current polarity cause the contacts of the track relays to vibrate in synchronism with the reversals. It will also be observed that the relative instantaneous polarity of the current delivered to the track rails through the back contacts of switch 16 and the front contacts of switch 24 is opposite to that of the current delivered through the back contacts of switch 16 and the back contacts of switch 24.

When a track relay is deenergized by the presence of a train in its block the contacts of said track relay are in their middle or neutral positions, this condition being shown in the case of track relay 10$^d$. Accordingly the solenoids 25 and 26 associated with the relay are continuously deenergized so long as the associated track relay remains deenergized. Thus the arms 21 and 22 operated by these solenoids have rotated to the limit of their clockwise movement and have caused the contacts of switch 23 to be opened and the front contacts of switch 24 to be opened and the back contacts thereof closed. Track circuit current therefore can be applied to block C only through the back contacts of switch 16$^d$ and back contacts of switch 24. Hence current will be supplied to the rails of block C intermittently or during each half revolution of cam disk 15. The relative polarity of this current is such as to cause the movable contacts of relay 10$^c$ to move to their right hand positions. Solenoid 26 associated with relay 10$^c$ will accordingly be intermittently energized but solenoid 25 will not be energized. Accordingly the front contacts of switch 24 at this station will be closed and the secondary of transformer 35 will be connected to the rails of block B through the back contacts of switch 16$^c$ and the front contacts of switch 24. The relative polarity of this current is such as to cause the movable contacts of track relay 10$^b$ to be operated to their left hand positions intermittently, closing the circuits of both solenoids 25 and 26 associated with this relay and causing the front contacts of switches 23 and 24 to be closed. Hence the secondary of transformer 35 will be continuously connected across the rails of block A but with periodically reversing relative polarity, and the contacts of relay 10$^a$, connected to block A, but not shown, will vibrate from one operated position to the other, which is the normal condition.

When the movable contacts of the track relays occupy their right hand positions, the secondaries of transformers 50 are connected across the power conductor and the track through conductors 51, contacts 52 and conductors 53. When the movable contacts of the track relays occupy their left hand positions, the secondaries of transformers 54 are connected across the third rail sections and track through conductors 55, contacts 56 and conductors 53. It will be observed that the primaries of transformers 50 are connected to line wire 31, while the primaries of transformers 54 are connected to line wire 30. It will be understood therefore that under clear conditions alternating currents of the two frequencies used in the system are alternately and periodically applied to the third rail sections; that under medium speed conditions, alternating current of one frequency is intermittently applied to the third rail section of the block in which such condition obtains; that under slow speed conditions alternating current of the other frequency is intermittently applied to the third rail section; and that under danger conditions no alternating signaling current whatever is applied to the third rail section. With vehicles in blocks A and D, as shown, the third rail section of block A has intermittently applied thereto the alternating potential of transformer 54, due to the intermittent movement of the contacts of relay 10$^b$ from their middle to their left hand positions, and the vehicle in block A would receive an intermediate speed indication. The third rail section of block B has applied thereto intermittently the alternating potential of transformer 50, due to the movements of track relay contacts 10$^c$ to the right, and if the vehicle in block A should advance into block B it would receive a slow speed indication. The third rail section for block C is not supplied with alternating signaling energy, due to the neutral position of the movable contacts of relay 10$^d$, so that if the vehicle should advance into this block it would receive a danger or stop indication.

It will be observed that the motors 11$^c$ and 11$^d$ are energized respectively from transformers 54 and 35 connected respectively to line wires 30 and 31. Thus if one frequency of the signaling current is twice that of the other the motors at these two stations will operate at different speeds, one motor operating twice as fast as the other, and consequently one cam disk 15 operating at twice the angular velocity of the other and causing its associated switch 16 to operate two times to one operation of the other switch.

In the application of the invention to electrically operated roads it is designed to have the switches 16 at adjacent stations operate at different frequencies, and the switches 16 at alternate stations operate at the same frequency, for a purpose hereinafter explained. The different frequencies of operation of switches at adjacent stations can be effected by making the speeds of the operating motors 11 different, as illustrated, or by operating the motors at the same speed and effecting different speeds of the cams 15 by suitable gearing. If alternate cams 15 operate at twice the speed of the adjacent cams, it is obvious that the movable contacts of the track relays will operate at the corresponding frequencies, said movable contacts at one series of alternate stations operating at twice the frequency of the movable contacts at the other series of alternate stations.

There are provided on the vehicle two relays 60 and 61 connected at one side to a contact 62 engaging the third rail and connected at the other side to the wheels and axle of the vehicle. These relays are made selectively responsive to the respective frequencies used in the system, relay 60 being made responsive to the frequency of transformers 54 and relay 61 to the frequency of transformers 50.

When relay 60 is energized and relay 61 deenergized, the following circuit is closed: from the negative battery lead, front contact 63, back contact 64, conductor 65, solenoid 66 and conductor 67 to the positive battery lead. When relay 60 is deenergized and 61 energized, the following circuit is closed: negative battery lead, back contact 68, front contact 69, conductor 70, solenoid 71, and conductor 72 to the positive battery lead.

Since under clear conditions the secondaries of transformers 50 and 54 are alternately and periodically connected to the third rail sections, it will be clear that under these conditions relays 60 and 61 will be alternately and periodically energized and will in turn cause the solenoids 66 and 71 to be alternately and periodically energized.

The plunger of solenoid 66 is connected to an arm 73 pivoted on a shaft 74 that is driven through suitable worm gearing 75 at a predetermined angular velocity by a motor 76. Fixed on shaft 74 adjacent arm 73 is a wheel 77, the periphery of which is engaged by a pawl carried by arm 73, whereby when solenoid 66 is energized arm 73 is rotated instantly to the limit of its counter-clockwise movement, but when the solenoid is deenergized arm 73 rotates in a clockwise direction with wheel 77. When arm 73 approaches the limit of its clockwise movement it engages and opens the contacts of a switch. Connected to the plunger of the solenoid 71 is an arm 79 having a pawl engaging the periphery of a wheel fixed on shaft 74, and this arm also is adapted to engage and open the contacts of a switch 81 at the termination of a predetermined interval following the deenergization of its associated solenoid. Under clear conditions the solenoids 66 and 71 are alternately energized at such frequency that neither arm 73 or 79 reaches a position where it opens the contacts of switch 78 or 81, and under these conditions the following circuit is closed: positive battery lead, conductor 82, contacts 83, conductor 84, contacts 85, conductor 86, clear lamp 87, conductor 88, front contacts 89 and 90 of a pair of relays 91 and 92 and conductor 93 to the negative battery lead. Relays 91 and 92 are normally energized through circuits hereinafter indicated. It will be noted that solenoid 127 is in parallel with lamp 87, for a purpose which will hereinafter appear.

Under medium speed conditions (the third block in advance occupied) transformer 54 only will be intermittently connected to the third rail section. Therefore under these conditions relay 60 will intermittently pick up, but relay 61 will be continuously deenergized. Therefore solenoids 66 will be intermittently energized, but solenoid 71 will not be energized. Hence a short time after the vehicle enters a block in which these conditions obtain arm 79 will have opened the contacts of switch 81, thereby opening the circuit of clear lamp 87 and closing the following circuit: positive battery lead, conductor 82, back contacts 94, conductor 95, a lamp 96, conductor 88, front contacts 89, 90 and conductor 93 to the negative battery lead.

Under slow speed conditions (the second block in advance occupied) the secondary of transformer 50 will be intermittently connected to the third rail section, and accordingly relay 61 only will be intermittently energized, thus intermittently energizing solenoid 71 and causing solenoid 66 to be continuously deenergized. Hence arm 73 will open the front contacts of switch 78 and close the back contacts thereof, while arm 79 will move away from switch 81. The closing of the back contacts of switch 78 closes the following circuit: positive battery lead, conductor 97, back contacts 98, a lamp 99, conductor 88, front contacts 89 and 90 and conductor 93 to the negative battery lead.

In order to prevent a false indication by reason of a vehicle entering an occupied block, I provide mechanism controlled by the frequency of the alternating current impulses. This mechanism comprises a pair of switches 100 and 101 controlling the relays 91 and 92 and operated by arms 102 and 103. These arms are pivoted on a shaft 104 driven through suitable gearing from shaft 74. Fixed on shaft 104 adjacent arm 102 is a wheel 105 the periphery of which is engaged by a pawl on arm 102. Similarly a wheel 106 is fixed on shaft 104 adjacent arm 103 and has its periphery engaged by a pawl on this arm. Arms 102 and 103 are connected to the plungers of solenoids 107 and 108 respectively and these solenoids are controlled respectively by switches 109 and 110 adapted to be operated by suitable step by step mechanism responsive to the frequency of the alternating current impulses.

The step-by-step mechanism shown comprises a ratchet wheel 111, an arm 112 rigid with the ratchet wheel 111, an operating pawl 113 and a holding pawl 114. Pawl 113 is operated by a magnet 115, the circuit of which is the following: positive battery lead, conductor 116, magnet 115, conductor 117, a contact segment 118, a brush 119 on an arm rigid with shaft 104, a contact segment 120, conductors 121 and 122, front contact 123 of relay 61 and back contact 124 of relay 60 to the negative battery lead. A branch of this circuit includes conductor 125, back contact 126 of a relay 127, conductor 128, back contact 129 of relay 61 and front contact 130 of relay 60. Relay 127 is in parallel with clear lamp 87, so that this relay will be energized when the clear lamp is displayed.

The number of energizations of magnet 115 during the time brush 119 is bridging contact segments 118 and 120 will depend upon the number of energizations of relay 60 or of relay 61 during this time and will therefore vary as the vehicle passes from one block into the adjacent block, due to the different frequencies of operation of the track relay contacts in adjacent blocks. If the contacts of one track relay operate at twice the frequency of the relays in adjacent blocks, then the number of energizations of step-up magnet 115 during the time brush 119 is bridging contact segments 118 and 120 will be doubled as the vehicle passes from the block of lower frequency to the block of higher frequency or will be halved as the vehicle passes from the block of higher frequency to the block of lower frequency. Under clear conditions, magnet 115 can only be energized through back contact 124 and front contact 123, while under medium and slow speed conditions, relay 127 being deenergized, magnet 115 can be energized either through front contacts 130, back contact 129 and back contact 126, or through back contact 124 and front contact 123. In short, no matter what the frequency of the alternating current received and no matter whether the conditions be clear, medium speed or slow speed, magnet 115 will be intermittently energized at a frequency depending upon the frequency of operation of the track relay contacts.

Holding pawl 114 is operated by a magnet 132 in the following circuit: positive battery lead, conductor 133, contact segment 134, a brush on the arm s rigid with shaft 104, contact segment 135, conductor 136, magnet 132, conductor 137 to the negative battery lead.

Assuming the vehicle to be travelling in a low frequency block, that is a block wherein the connection of energy to the third rail section is controlled by track relay contacts operating at low frequency, when the brushes on arm s engage the contact segments holding magnet 132 will be energized and the holding and operating pawls will engage ratchet wheel 111, and magnet 115 will be energized a certain number of times stepping the arm 112 into engagement with contacts 109, whereupon the brush 119 will bridge a pair of insulated contacts segments 140, closing the following circuit: positive battery lead, conductor 141, solenoid 107, conductor 142, contacts 109, conductor 143, contacts 140 bridged by brush 119, and conductors 144 and 145 to the negative battery lead. The brushes will then leave the contact segments, causing deenergization of holding magnet 132 and permitting the holding and operating pawls to move out of engagement with ratchet wheel 111, whereupon the latter and arm 112 will return to initial position. Thus when the vehicle is travelling in a low frequency block solenoid 107 will be intermittently energized, once on each rotation of arm *s*. When the vehicle is travelling in a high frequency block, the ratchet wheel will be stepped around to engage arm 112 with contacts 110 during each rotation of arm *s*, and consequently when brush 119 engages contacts 140, the following circuit will be closed: positive battery lead, conductor 146, solenoid 108, conductor 147, contacts 110, conductor 143, contacts 140, and conductors 144 and 145 to the negative battery lead.

Switch 100 is adapted to close a pick up circuit through relay 91 and a stick circuit through relay 92. The pick-up circuit is from the positive battery lead by way of conductor 148, contacts 149, conductor 150, the winding of relay 91, and conductors 151 and 145 to the negative battery lead. The stick circuit is from the positive battery lead, conductor 148, contacts 152, conductor 153, front contact 154, conductor 155, the winding of relay 92 and conductors 151 and 145 to the negative battery lead. Switch 101 is adapted to close a pick up circuit through relay 92 and a stick circuit through relay 91. These circuits are exactly similar to the circuits last described and will be obvious from the drawing.

If the vehicle should enter a danger block, that is, a block immediately in rear of an occupied block, it would, as previously pointed out, receive no signaling impulses, and hence neither solenoid 107 nor 108 would be intermittently energized and a predetermined time after the entry of the vehicle into such a block, both switches 100 and 101 would be opened, causing both of the relays 91 and 92 to drop. As long as these relays are deenergized none of the signals can be displayed, as the common return 88 of all the signals passes through front contacts 89 and 90 of these relays. If the vehicle should actually enter the occupied block, it would receive signaling impulses unless the block in advance of said occupied block were occupied. These impulses would intermittently energize one or the other of solenoids 107 and 108, depending upon whether the impulses were of low or high frequency. Under these conditions one or the other of relays 91 and 92 would pick up due to the closing of its pick-up circuit at switch 100 or 101, as the case may be. Only one of the relays, however, would pick up, and hence the signals on the vehicle entering the occupied block could not be displayed, and said vehicle would not receive a false indication. In short, after a vehicle has once entered a danger block and its relays 91 and 92 have dropped, it is necessary in order to reenergize both relays that the vehicle receive signaling impulses first of one frequency and then of the other frequency, and obviously this cannot occur until the block in advance of the vehicle has been cleared and the vehicle enters this block at a time when the block in advance thereof is clear.

Now having particularly described a system embodying my invention, what I claim as new and desire to secure by Letters Patent of the United States is:

1. In a railway signaling system for electrically operated roads, a track and a power conductor divided into blocks, track relays connected at the entrances of the blocks, means for connecting sources of electrical energy to the exit ends of the blocks and periodically reversing the polarity thereof, to cause the track relay contacts to vibrate, means controlled by said track relay contacts for connecting sources of electrical energy across the track and power conductor, a vehicle having translating devices connected to said power conductor and track, and signaling mechanism controlled by said translating devices.

2. In a railway signaling system for electrically operated roads, a track and a power conductor divided into blocks, track relays connected at the entrance ends of the blocks, motor operated circuit controllers for connecting sources of electrical energy across the track at the exit ends of the blocks and periodically reversing the polarity thereof, to cause the track relay contacts to vibrate, means for connecting sources of electrical energy across the power conductor and track controlled by said contacts, a vehicle having translating devices connected to said power conductor and track, and signaling mechanism controlled by said translating devices.

3. In a railway signaling system for electrically operated roads, a track and a power conductor divided into blocks, track circuits for the blocks including track relays, means controlled by said track relays for connecting electrical energy intermittently across the power conductor and track, the frequency with which the connections are made being different in the case of adjacent blocks, a vehicle having translating devices connected to the power conductor, signal mechanism controlled by said translating devices, and means preventing the clearance of said signal mechanism until the vehicle has successively received impulses of two different frequencies.

4. In a railway traffic controlling system, in combination with a track and a power conductor divided into blocks, means for alternately and periodically connecting sources of alternating current of different frequencies across the power conductor sections and track under predetermined traffic conditions, a vehicle having relays connected across the power conductor and track selectively responsive to said frequencies, and vehicle governing means controlled by said relays.

5. In a railway traffic controlling system, in combination with a track and a power conductor divided into sections, means for alternately and periodically connecting two sources of alternating current of different frequencies across the power conductor sections and track under predetermined traffic conditions, a vehicle having two relays connected across the power conductor and track responsive respectively to said frequencies, a magnet on the vehicle having a circuit including the front contact of one relay and the back contact of the other relay, a second magnet on the vehicle having a circuit including the front contact of said other relay and a back contact of the first mentioned relay, and a signal controlled by said magnets and displayed only when both of said magnets are intermittently energized.

6. In a railway traffic controlling system, in combination with a track and a power conductor divided into sections, means for alternately and periodically connecting two sources of alternating current of different frequencies across the power conductor sections and track under predetermined traffic conditions, a vehicle having two relays connected across the power conductor and track responsive respectively to said frequencies, and a signal on the vehicle which is displayed only when said relays are alternately and periodically energized.

7. In a railway traffic controlling system, in combination with a track and a power conductor divided into blocks, means for impressing electrical impulses on the power conductor sections of predetermined frequencies, the frequencies of the impulses being different in the case of adjacent blocks and the same for alternate blocks, a vehicle having translating devices connected to the power conductor, vehicle governing means controlled by said translating devices, means on the vehicle for integrating the impulses per fixed interval, and mechanism controlled by said integrating means for controlling said vehicle governing means.

8. In a railway traffic controlling system, in combination with a track and a power conductor divided into sections, means for alternately and periodically connecting two sources of alternating current of different frequencies across the power conductor and track under predetermined traffic conditions, means for periodically connecting one of said sources across the power conductor and track under different traffic conditions, means for periodically connecting the other of said sources across the power conductor and track under still different traffic conditions, a vehicle having relays connected across the power conductor and track selectively responsive to said frequencies, and vehicle governing means controlled by said relays.

9. In a railway traffic controlling system, the combination with a track divided into insulated blocks, of an alternating current track relay at the entrance end of each block having two windings, one of which is connected across the rails and the other of which is connected to a source of alternating current energy, means for connecting said source of energy across the rails at the exit end of each block and for periodically reversing the connections of said source to the rails, whereby the track relay contacts periodically vibrate from one position to the opposite position, and traffic controlling means governed by said relays and held at one indication only so long as said contacts thus vibrate.

10. In a railway traffic controlling system, the combination with a track divided into insulated blocks, of an alternating current track relay at the entrance of each block having two windings, one of which is connected across the rails and the other of which is connected to a source of alternating current energy, means for connecting said source of energy across the rails at the exit ends of the blocks and for periodically reversing the connections of said source to the rails under predetermined traffic conditions, whereby the track relay contacts periodically vibrate from one position to the opposite position, means for periodically connecting said source to the exit ends of the blocks with one relative polarity under different traffic conditions, means for periodically connecting said source to the exit ends of the blocks with the other relative polarity under still different traffic conditions, and traffic governing means controlled by said relays.

11. In a traffic controlling system, in combination, a track and a conductor divided into blocks, track circuits for the blocks including track relays, means controlled by said track relays for connecting sources of electrical energy intermittently to the conductor sections, the frequency with which the connections are made being different in the case of adjacent blocks, a vehicle having a translating device adapted to be energized from said conductor, signal mechanism controlled by said translating device, and means for clearing the signal mechanism when said translating device has been successively actuated by impulses of different frequencies.

12. In a traffic controlling system, in combination, a track divided into insulated blocks, a track relay connected across the rails at the entrance end of each block, a motor operated circuit controller associated with each track relay for connecting a source of energy across the track rails at the exit ends of the blocks and periodically reversing the polarity of said energy under normal conditions, switch mechanism associated with each circuit controller and operating when a track relay is deenergized to cause the circuit controller associated with the deenergized relay and with the track relay immediately in rear to apply energy of one polarity intermittently to the block immediately in rear of the deenergized relay and energy of the other polarity intermittently to the second block in rear, and train control mechanism selectively actuated by energy flowing in the track rails.

13. In a railway traffic controlling system, a track divided into insulated blocks, a track relay connected across the rails at the entrance end of each block, a constantly operating motor associated with each track relay, switch mechanism operated by each motor adapted to connect a source of electrical energy across the rails at the exit ends of the respective blocks and to vary periodically the characteristic of said energy, means associated with each switch mechanism and controlled by the respective track relays for governing the application of energy by said switch mechanism, and train control mechanism actuated selectively according to the characteristic of the energy flowing in the track rails.

14. In a railway signaling system, a track divided into blocks, a track relay connected across the rails at the entrance end of each block, a constantly operating motor associated with each track relay, a circuit controller operated by each motor for connecting energy across the rails at the exit ends of the blocks and for periodically varying the characteristic of said energy under normal conditions, switch mechanism associated with each controller operating when a track relay is deenergized to cause the controller associated therewith and with the track relay immediately in rear to apply energy having one characteristic to the block immediately in rear of the deenergized relay and energy of a different characteristic to the second block in rear, and traffic controlling means actuated selectively in accordance with the character of the energy flowing in the track rails.

In testimony whereof I hereunto affix my signature.

EDWARD C. SASNETT.